United States Patent [19]
Feminella et al.

[11] 3,935,323
[45] Jan. 27, 1976

[54] PROCESS FOR IMPROVING WHIPPING PROPERTIES OF AQUEOUS PROTEIN SOLUTIONS

[75] Inventors: Joseph V. Feminella, Trumbull, Conn.; Donald A. Grindstaff, Minnetonka, Minn.

[73] Assignee: Stauffer Chemical Company, Westport, Conn.

[22] Filed: Dec. 6, 1973

[21] Appl. No.: 422,213

[52] U.S. Cl. .................. 426/564; 426/583; 426/572
[51] Int. Cl.² ..... A23J 1/20; A23J 3/02; A23G 3/00
[58] Field of Search ........... 426/163, 185, 186, 356, 426/360, 329, 564, 572; 260/122

[56] References Cited
UNITED STATES PATENTS

| | | |
|---|---|---|
| 1,939,326 | 12/1933 | Turnbow .......................... 426/356 |
| 2,507,480 | 5/1950 | McDonald et al. ................ 426/361 |
| 2,555,514 | 6/1951 | Sharpe et al. ..................... 426/360 |
| 2,606,181 | 8/1952 | Pratt et al. ........................ 260/122 |
| 2,695,235 | 11/1954 | Goede ............................... 426/360 |
| 2,765,232 | 10/1956 | Rodgers et al. .................... 426/356 |

Primary Examiner—Jeanette M. Hunter

[57] ABSTRACT

Aqueous solutions containing dissolved cheese whey protein exhibiting improved whipping properties are obtained by heating the solution to within the range of at least 90° C. to less than 99° C., thereafter cooling the solution to less than 60° C., and whipping the solution within about 8 hours after heating. The process is particularly effective with protein solutions derived from cheese whey protein concentrates.

9 Claims, No Drawings

PROCESS FOR IMPROVING WHIPPING PROPERTIES OF AQUEOUS PROTEIN SOLUTIONS

Background of the Invention

This invention relates to a process for improving the whipping properties of aqueous solutions containing dissolved protein, and particularly aqueous solutions containing dissolved cheese whey protein. The products can be used as a whippable replacement for egg whites in foods when heat coagulability of foamed egg whites is not required.

Heretofore, two basic types of cheese whey products have been produced on a commercial scale. The most common product may be described as "dried whole whey." This product is usually prepared by spray drying cheese whey. However, the use of dried whole whey in food systems is limited to food systems in which a filler or binder is required. The relatively high lactose content of this product limits its use in certain food products.

Another cheese whey product currently commercially available can be described as "whey protein concentrate." This whey product is generally prepared by separating, by physical or chemical means, the protein from the lactose and minerals contained in cheese whey. The whey protein concentrate thus obtained is useful as a nonfat dry milk and casein substitute in food products.

Due to the high cost of egg white solids as compared to whey protein concentrates, attempts have been made to use whey protein concentrates to replace, either totally or partially, the egg white solids normally contained in food systems. However, problems were encountered with this area of use which relate generally to the apparent nonequivalence of functionality of whey protein concentrates and egg white solids in food systems. Whey protein concentrates tend to exhibit poor whippability. If adequate whippability is obtained, the foam stability of whey protein concentrates is inadequate to provide a stable foam approximating that obtained with egg whites.

U.S. Pat. No. 1,787,754 teaches that raw cheese whey can be treated by the addition of 3 to 4 percent slaked lime and heated to precipitate whey proteins. The precipitated whey proteins are said to function as whipping agents. However, it is also known that the addition of slaked lime to cheese whey results in a pH substantially above 10, which, when combined with heating, causes alkaline hydrolysis of whey proteins and development of off-flavor.

The above problems are overcome in the process of the present invention by heating the aqueous protein solution under conditions which avoid the alkaline hydrolysis of protein and related off-flavor development and thereby provide useful whippable protein product.

Summary of the Invention

In accordance with the present invention, there is provided a process for improving the whipping properties of aqueous solutions containing dissolved cheese whey protein which comprises heating an aqueous solution containing dissolved cheese whey protein having a protein concentration of about 5 grams per liter to about 100 grams per liter to a temperature within the range of at least 90° C. to less than 99° C. the aqueous solution being heated to a temperature within the range for no more than 5 minutes; cooling the aqueous solution containing dissolved cheese whey protein to below 60° C.; and whipping the aqueous solution containing dissolved protein within about 8 hours after heating. Further improved results can be achieved by the addition of a food grade alkali metal citrate to the aqueous solution containing dissolved cheese whey protein prior to heating. The product of the invention has been found useful as a total or partial replacement for the egg white solids normally used in food products, in which stable nonheat-coagulated whipped foams are required.

DETAILED DESCRIPTION OF THE INVENTION

By the term aqueous solution containing dissolved cheese whey protein, it is meant herein an aqueous solution containing dissolved acid cheese whey protein, sweet cheese whey protein, or mixtures thereof, either in its natural form, i.e., cheese whey, or concentrated by means such as evaporation, gel filtration, ultrafiltration, or the like. Also included within the term aqueous solution containing dissolved cheese whey protein are aqueous solutions containing partially delactosed cheese whey, partially demineralized cheese whey, and partially delactosed/demineralized cheese whey.

By the term acid cheese whey protein, it is meant herein protein contained in cottage cheese whey, casein cheese whey, or mixtures thereof. By the term sweet cheese whey protein, it is meant herein protein contained in cheddar cheese whey, Swiss cheese whey, mozzarella cheese whey, or mixtures thereof.

Preferably, the cheese whey protein useful in the practice of the present invention is a cheese whey protein concentrate obtained by gel filtration of cheese whey, usually a partially delactosed cheese whey, or a cheese whey protein concentrate obtained by electrodialysis of cheese whey or partially delactosed cheese whey, or a cheese whey protein concentrate obtained by reverse osmosis and/or ultrafiltration of cheese whey or partially delactosed cheese whey. Most preferably, the process of the present invention is directed to the utilization of an aqueous solution containing cheese whey protein concentrates obtained by gel filtration of partially delactosed cheese whey in accordance with U.S. Pat. No. 3,547,900.

The protein concentration of the aqueous solution containing dissolved cheese whey protein, hereinafter referred to as the aqueous protein solution, is from about 5 grams per liter to about 100 grams per liter. The protein concentration is determined herein by total Kjeldahl nitrogen, which is equal to the total nitrogen times an appropriate constant, which relates the total nitrogen to protein, i.e., (6.38) for cheese whey proteins in accordance with: *Methods of Analysis — A.O.A.C.*, 16, (1970) 11th Ed. Preferably, the protein concentration of the aqueous protein solution is from about 20 grams per liter to about 50 grams per liter. Most preferably, the protein concentration of the aqueous protein solution is from about 30 grams per liter to about 50 grams per liter.

In accordance with the process of the present invention, the aqueous protein solution is heated to a temperature within the range of from at least 90° C. to less than 99° C. Preferably, the aqueous protein solution is heated to a temperature within the range of from about 95° C. to less than 99° C. Temperatures within the above specified broad range are critical in terms of modifying the protein contained in the aqueous protein solution, so that the aqueous protein solution thus obtained exhibits improved whippability and foam stability.

Heating the aqueous solution in accordance with the process of the present invention can be effected by conventional means, as for example, heating elements comprising hot plates, heating jackets, superheated steam, or other methods capable of effectively raising the temperature of the aqueous solution. It is preferred to heat the aqueous protein solution at a constant rate above about 60° C. in order to avoid excessive protein denaturation. Preferably, the rate of heating the aqueous protein solution above about 60° C. is from about 5° C. to about 30° C. per minute.

Since the temperature to which the aqueous protein solution is heated is critical, means for accurately measuring the temperature of the aqueous protein solution within the temperature range of 90° C. to 99° C. should be provided for operation of the process of the present invention. Any means which accurately measures the temperature of the aqueous protein solution within the range specified can be used.

The pH of the aqueous protein solution of the present invention is maintained within the range of from about 5.0 to about 8.5. Preferably, the pH of the aqueous protein solution is maintained within the range of from about 6.0 to about 7.5. Highly acidic, or alkaline conditions are to be avoided in order to minimize hydrolysis of the protein in the aqueous protein solution.

The aqueous protein solution should be heated to a temperature within the range of about 90° to 99° C. for not more than about 5 minutes. Preferably, the aqueous protein solution is heated to a temperature within the range of about 90° to 99° C. for about 0.1 minute in order to minimize protein heat coagulation.

After heating the aqueous protein solution is cooled to below about 60° C. Cooling is preferably effected at a rate of from about 5° C. to about 30° C. per minute. Preferably, the temperature of the aqueous solution is reduced to about 60° C. at a rate of from about 15° C. to about 25° C. per minute. Cooling can be effected by discontinuing heating and allowing the aqueous solution to cool at ambient temperature, by use of refrigeration, heat exchange with water, or other cooling methods.

The aqueous protein solution is preferably agitated during the heating and cooling steps. Stirring is preferred in order to evenly heat, or cool as required for these steps.

It has also been discovered that further improved results can be obtained by the addition of a food grade alkali metal citrate, such as potassium citrate, sodium citrate, or mixtures thereof to the aqueous protein solution prior to heating. The addition of the citrate further enhances the improved whipping properties of the aqueous protein solution. The food grade citrate is used at a concentration of from about 0.1 gram per liter to about 5 grams per liter of the aqueous protein solution. Preferably, the food grade citrate is added to the aqueous protein solution at a concentration of from about 0.8 to about 1.5 grams per liter.

The aqueous protein solution treated in accordance with the present invention may also contain added ingredients to affect taste, as for example, sugar, flavoring, or other desired additional ingredients. Preferably, these added ingredients are added after whipping.

The heat-treated aqueous protein solution of the present invention must be whipped within about 8 hours after heating. Preferably, the aqueous protein solution is whipped within about 4 hours after heating. Means for whipping the aqueous protein solution include for example, mixers with fixed rotational type mixing blades or planetary type mixing blades. The mixers are exemplified by Kitchen Aid mixers, Hobart mixers, Votator mixers, and the like. Preferably, the aqueous protein solution is whipped at a rate sufficient to effectively whip the product which is usually in the range from about 200 to about 1000 revolutions per minute. The heat-treated aqueous protein solution can be whipped at a temperature within the range of from about 10° C. to about 38° C. Preferably, the aqueous protein solution is whipped at a temperature within the range of from about 15° C. to about 24° C.

The aqueous protein solution treated in accordance with the process of the present invention can be used in food products as a replacement for foamed nonheat-coagulable egg whites normally contained therein. More particularly, the aqueous protein solution obtained in accordance with the process of the present invention can be used as a partial replacement for egg whites in candy formulations, such as, short nougat, wherein the egg whites are used as foaming agents. Preferably, the heat-treated aqueous protein solution of the present invention can be used to replace about 50% (solids basis) of the egg white solids normally used in a food formulation as a foaming agent.

However, the aqueous protein solution prepared according to the process of the present invention is not suitable as a replacement for egg whites used in food systems requiring the heat-set or coagulation property of egg whites. For example, the aqueous solution obtained in accordance with the process of the present invention can not be used as a total or partial replacement for egg whites normally used in the preparation of a meringue type product.

The invention is further illustrated by the examples which follow.

The preparation of partially delactosed/demineralized cheese whey by gel filtration is illustrated in Example 1.

EXAMPLE 1

To 6,800 pounds of raw cheese whey prepared by blending 4,080 pounds of cottage cheese whey and 1,720 pounds of pH adjusted (pH 4.5) cheddar cheese whey at a temperature between 52° and 57° C., is added 14.5 pounds of dry sodium hydroxide to adjust the pH to about 7.0. The pH adjusted whey is centrifugally clarified to remomve insoluble solids. The supernatant from the clarification contains about 420 pounds of dissolved solids.

The clarified supernatant is concentrated by evaporative methods at a temperature between 60° and 68° C. to about 60% solids. The concentrate is cooled to about 21° C. to effect lactose crystallization. Crystalline lactose is then separated by centrifugation to yield a partially delactosed cheese whey mother liquor. About 70% of the lactose originally present in the cheese whey is removed in the delactosing. The partially delactosed mother liquor contains about 40% solids and has the typical chemical analysis presented in Table I.

TABLE I

| | Percent |
|---|---|
| Lactose | 46 |
| Protein | 20 |
| Ash | 20 |
| Fat & Organic Residuals | 14 |

The partially delactosed mother liquor contains about 190 pounds of solids and is passed through a bed of molecular sieve resin according to the process described in U.S. Pat. No. 3,547,900. Two major fractions are obtained from the molecular sieve resin bed. The first fraction contains about 36 pounds of solids and consists mainly of protein with residual lactose and mineral. The solids contained in this fraction are used in the process of the present invention. The first fraction exhibits the typical chemical analysis presented in Table II.

TABLE II

| | Percent |
|---|---|
| Protein | 54 |
| Lactose | 25 |
| Ash | 14 |
| Fat | 2 |
| Lactate | 3 |
| Citrate | 2 |

Fractionation can be determined by measuring the conductivity of the eluant from the bed. Typically, the conductivity range for the first fraction containing partially delactosed/demineralized whey solids useful in the practice of the present invention is between about 0 micromhos and about $6 \times 10^3$ micromhos, as shown in FIG. 7, of U.S. Pat. 3,547,900.

The solution obtained by recovering the first fraction is concentrated by vacuum evaporation prior to spray drying to yield about 30 pounds of partially delactosed/demineralized whey. This product is presently commercially available from Stauffer Chemical Company under the trademark ENRPRO—50 (modified whey solids).

EXAMPLES 2-3

In Example 2, an aqueous protein solution was prepared by dissolving a sample of partially delactosed/demineralized cheese whey, prepared in accordance with the procedure of Example 1, in water to a protein concentration of 20 grams per liter. The aqueous protein solution was heated to 98° C. with constant stirring to assure uniform heating. Immediately after the temperature of the solution reached 98° C., heating was discontinued and the solution was cooled to room temperature by placing the solution in a cold water bath. The solution was heated within the range of 90° to 98° C. for less than 2 minutes. Shortly after reaching room temperature, about 1.5 hours after termination of heating, the heat treated sample was whipped for 2 minutes using a Kitchen Aid mixer, Model No. K5A, from the Hobart Manufacturing Company, at top speed (Speed No. 10 at 280 r.p.m.) to produce a foam.

The stability of the foam was determined by measuring the rate of syneresis according to the following procedure. A funnel was filled with the foam and placed above a graduated cylinder. The amount of liquid which dropped from the funnel was collected and the amount recorded. The results of the tests are shown in Table III.

Example 3 is a control consisting of a sample of cheese whey prepared as described in Example 2 without heating. The foam stability of this sample was determined and the results shown in Table III.

TABLE III

| Time (minutes) | Example 2 Volume of Liquid (milliliters) | Example 3 Volume of Liquid (milliliters) |
|---|---|---|
| 1 | None | 0.4 + foam |
| 2 | None | 1.5 + foam |
| 3 | None | 2.2 + foam |
| 5 | Trace | 3.0 + foam |
| 8 | 0.5 | 3.7 + foam |
| 10 | 0.8 | 4.0 + foam |
| 20 | 2.2 | 4.9 + foam |

It is apparent from the data presented in Table III that heat treatment in accordance with the process of the present invention substantially improves the foam stability of partially delactosed/demineralized cheese whey.

The following examples show the effect of the addition of an alkali metal citrate to the aqueous solution prior to heat treatment in accordance with the present invention.

EXAMPLES 4-7

Examples 4, 5, 6 and 7 presented in Table IV were obtained as follows.

Cheese whey protein consisting of partially delactosed/demineralized cheese whey was prepared by gel filtration in accordance with the procedure outlined in Example 1. The aqueous protein solutions containing dissolved cheese whey protein at a concentration of 10 grams per liter were treated where indicated in Table IV in accordance with the procedure outlined in Example 2. The alkali metal citrate, potassium citrate, was added to the samples where indicated in Table IV at a concentration of 1.0 gram per liter. Potassium citrate addition to the aqueous protein solution was effected prior to heating. The aqueous protein solution was cooled according to the procedure outlined in Example 2. The whipping tests were performed as described in Example 2.

TABLE IV

| | Foam Syneresis (milliliters) | | | |
|---|---|---|---|---|
| Time (minutes) | Example 4 Citrate Heat | Example 5 (Control) Citrate No Heat | Example 6 No Citrate Heat | Example 7 (Control) No Citrate No Heat |
| 20 | 4.8 | 9.4 | 8.0 | complete at 20 minutes |
| 40 | 5.2 | complete at 30 minutes | 8.2 | |
| | complete at 45 minutes | | complete at 40 minutes | |

It is apparent from Examples 4, 5 and 6 of Table IV that heating in the presence of potassium citrate, substantially improves the foam stability of the aqueous solution. It is also apparent from Examples 5 and 7 of Table V that the presence of the alkali metal citrate without heating does not significantly improve the foam stability of the aqueous protein solution.

EXAMPLES 8–11

Examples 8, 9, 10 and 11 presented in Table V were obtained as follows.

The aqueous protein solution used in these examples was prepared in accordance with the procedure of Example 1 from a blend of 40% cheddar cheese whey, 45% cottage cheese whey, and 15% mozzarella cheese whey. The aqueous protein solution contained dissolved cheese whey protein at a concentration of 10 grams per liter. The samples were treated as indicated in Table V in accordance with the procedure outlined in Example 2. The potassium citrate was added to the samples where indicated in Table V at a concentration of 1.0 gram per liter of the aqueous protein solution. Citrate addition was effected prior to heating. The cooling and whipping of the aqueous protein solutions were effected in accordance with the procedure described in Example 2.

TABLE V

| | Foam Syneresis (milliliters) | | | |
|---|---|---|---|---|
| Time (minutes) | Example 8 No Citrate Heat | Example 9 (Control) No Citrate No Heat | Example 10 Citrate Heat | Example 11 (Control) Citrate No Heat |
| 20 | 6.8 | complete at 9 minutes | 5.6 | complete at 14 minutes |
| 40 | complete at 30 minutes | | 7.2 | |
| | | | complete at 43 minutes | |

It is apparent from Examples 8 and 11 that a blend of cheese whey protein can be heated in accordance with the process of the present invention to substantially improve the foam stability of the aqueous solution. It is also apparent from Examples 8, 9 and 10 that heating in accordance with the process of the present invention in the presence of potassium citrate substantially improves the foam stability of the aqueous solution.

EXAMPLES 12–14

Products of the invention were evaluated as a partial replacement for egg white solids in a short nougat formulation against a control formulation.

In Example 12, a heat treated partially delactosed/demineralized cheese whey containing potassium citrate replaced 50% of the egg white solids based on egg white solids normally present in a short nougat formulation.

In Example 13, the short nougat was prepared in accordance with the procedure of Example 12, except that 50% of the egg white solids was replaced with partially delactosed/demineralized cheese whey which was not heated in accordance with the process of the present invention and which did not contain the alkali metal citrate.

In Example 14, the short nougat was prepared in accordance with the procedure of Example 12, except that none of the egg white solids were replaced.

The specific formulations used in Examples 12–14 are presented in Table VI.

The procedure used to prepare the short nougat was as follows:

1. The partially delactosed/demineralized cheese whey was dissolved in 24 milliliters of water, heated to 98°C. and cooled to room temperature in accordance with the process of the present invention.
2. The egg white solids were then added to the thus treated solution and whipped with a Kitchen Aid mixer at top speed (Speed No. 10 at 280 r.p.m.).
3. The sugar and corn syrup were dissolved in 100 milliliters of water and heated to 113°C.
4. About 23 grams of the hot syrup from (3) above were slowly poured into the whipped mixture while constantly whipping this solution.
5. The remaining syrup was heated to 121°C. and poured into the whipping mixture.
6. Whipping was continued for a total of 4 minutes.
7. The margarine (melted) and vanilla were then added to the mixture and whipping was continued for an additional minute.
8. The short nougat prepared as described above was poured onto a piece of oiled wax paper and allowed to set, prior to evaluation.

TABLE VI

| Ingredient | Example 12 Weight (grams) | Example 13 Weight (grams) | Example 14 Weight (grams) |
|---|---|---|---|
| Sucrose (50–60%)* | 454.0 | do. | do. |
| Corn Syrup (20–30%)* | 227.0 | do. | do. |
| Water (10–20%)* | 124.0 | do. | do. |
| Egg White Solids (0.2–0.5%)* | 1.45 | 1.45 | 2.90 |
| Partially delactosed/ demineralized cheese whey - heat treated | 1.45 | 0 | 0 |
| Partially delactosed/ demineralized cheese whey - not heat treated | 0 | 1.45 | 0 |
| Sodium Citrate | 0.0072 | do. | do. |
| Margarine (2–4%)* | 23.0 | do. | do. |
| Vanilla | 4.0 | do. | do. |

*Broad use ranges, as is basis.

The short nougat prepared as described above was evaluated. The evaluation data is presented in Table VII.

TABLE VII

SHORT NOUGAT EVALUATION

| Example Description | Flavor | Body & Texture | Color |
|---|---|---|---|
| Example 12 (heat treated whey, 50%) | OK | Fairly Soft; Short (breaks off when pulled) | Light Beige |
| Example 13 (nonheat treated whey, 50% | OK | Sticky, Taffy-like | Light Beige |
| Example 14 (control, egg white, 100%) | OK | Soft; Short (breaks off when pulled) | Light |

It is apparent from Table VII that the partial replacement of egg white solids by partially delactosed/demineralized cheese whey prepared in accordance with the process of the present invention, provides a product which exhibits adequate flavor, body texture, and color, as compared with the sample of short nougat prepared with egg white solids in accordance with Example 14. In addition, Examples 12 and 13 show that partially delactosed/demineralized cheese whey prepared in accordance with the process of the present invention produces a superior short nougat over that prepared in accordance with Example 13 containing partially delactosed/demineralized cheese whey at the same concentration, but without treatment in accordance with the process of the present invention. Specifically, comparison of Examples 12, 13, and 14 clearly shows that the nonheat-treated whey produces a sticky, taffy-like product having unacceptable body and texture. The general short nougat formulation and preparation is well known and can be found in the *Women's Day Encyclopedia of Cookery*, Vol. 2, page 288, (1967).

What is claimed is:

1. A process for improving the whipping properties of an aqueous solution containing dissolved cheese whey protein consisting essentially of
   a. heating an aqueous solution containing dissolved cheese whey protein having a protein concentration of about 5 grams per liter to about 100 grams per liter to a temperature within the range of at least 95°C. to less than 99° C. said aqueous solution being heated to a temperature within said range for not more than 5 minutes;
   b. cooling said aqueous solution containing dissolved cheese whey protein to below about 60° C.; and
   c. whipping said aqueous solution containing dissolved cheese whey protein within about 8 hours after heating.

2. The process of claim 1 wherein said cheese whey protein is sweet cheese whey protein.

3. The process of claim 2 wherein said sweet cheese whey protein is selected from the group consisting of cheddar cheese whey proetein, Swiss cheese whey protein, mozzarella cheese whey protein, and mixtures thereof.

4. The process of claim 1 wherein said cheese whey protein is derived from partially delactosed/demineralized cheese whey having a protein concentration between about 14% to about 90% (dry weight basis).

5. The process of claim 1 which further includes the step of incorporating flavoring ingredients in said whipped aqueous solution containing dissolved protein, said ingredient being added before, during or after whipping.

6. The process of claim 1 which further includes the step of adding a food grade citrate selected from the group consisting of potassium citrate, sodium citrate, or mixtures thereof to said aqueous solution containing dissolved protein at a concentration of about 0.1 gram per liter to about 5 grams per liter prior to heating.

7. The process of claim 2 wherein said cheese whey protein is selected from the group consisting of cheddar cheese whey protein, Swiss cheese whey protein, mozzarella cheese whey protein, or derived from partially delactosed/demineralized cheese whey having a protein concentration within the range of from about 14% to about 90% (dry weight basis), or mixtures thereof.

8. The process of claim 1 which further includes the step of adding a food grade citrate selected from the group consisting of potassium citrate, sodium citrate, or mixtures thereof to said aqueous solution containing dissolved protein at a concentration of about 0.1 gram per liter to about 5 grams per liter prior to heating.

9. The product of the process of claim 1.

* * * * *